Dec. 15, 1953  V. S. RUTHERFORD ET AL  2,662,540
CONTROL SYSTEM
Filed Feb. 11, 1950

INVENTORS
VICTOR S. RUTHERFORD,
AND ANTHONY J. HORNFECK
PAUL S. DICKEY
BY Raymond W. Jenkins
ATTORNEY Dec. 15, 1953    V. S. RUTHERFORD ET AL    2,662,540
CONTROL SYSTEM
Filed Feb. 11, 1950    2 Sheets-Sheet 2

INVENTORS
VICTOR S. RUTHERFORD,
AND ANTHONY J. HORNFECK
PAUL S. DICKEY
BY Raymond W. Junkin
ATTORNEY Patented Dec. 15, 1953

2,662,540

UNITED STATES PATENT OFFICE 2,662,540

CONTROL SYSTEM

Victor S. Rutherford, East Cleveland, Anthony J. Hornfeck, Lyndhurst, and Paul S. Dickey, East Cleveland, Ohio, assignors to Bailey Meter Company, a corporation of Delaware Application February 11, 1950, Serial No. 143,748

8 Claims. (Cl. 137—85)

Our invention relates to measuring and/or control systems and particularly to systems sensitive to the value, or change in value, of a variable condition, position, or the like; for establishing a fluid loading pressure bearing a predetermined functional relation to the value being measured. The loading pressure may, either locally or remotely, produce a visual representation of the value, a record of the value, and/or may be used for regulating an agent which may or may not effect the value of the variable.

The variable may be fluid rate of flow, temperature, pressure, voltage, humidity, or the like, and the agent may be regulated by moving a damper, valve or similar regulating device. Or the variable may be a position of an object, such, for example, as a damper, which is desirably to be known or made use of at a location remote from the object.

It frequently happens that the measuring apparatus, sensitive to the variable, desirably may be located at a considerable distance from the visual representation thereof, or from the controller, and again from the damper or other object to be positioned. It is frequently most desirable to telemeter such intelligence over considerable distances by electric systems, while it may be necessary or desirable to visually represent the value or to actuate a regulating means by fluid pressures.

It is, therefore, a principal object of our present invention to provide a measuring and/or control system of a transducer nature wherein electrical values are translated into corresponding or representative fluid pressures.

A further object is to provide an electric measuring and telemetering system whose receiver establishes fluid loading pressures representative of the variable being measured; and wherein the measuring transmitter and the receiver may be spaced a considerable distance apart.

We have chosen to illustrate and describe as a specific embodiment of our invention a system for measuring a fluid rate of flow and for controlling a fluid flow. It will be understood that this is by way of example only and that the invention may take various forms and may be embodied in different systems and the like.

Figure 1:
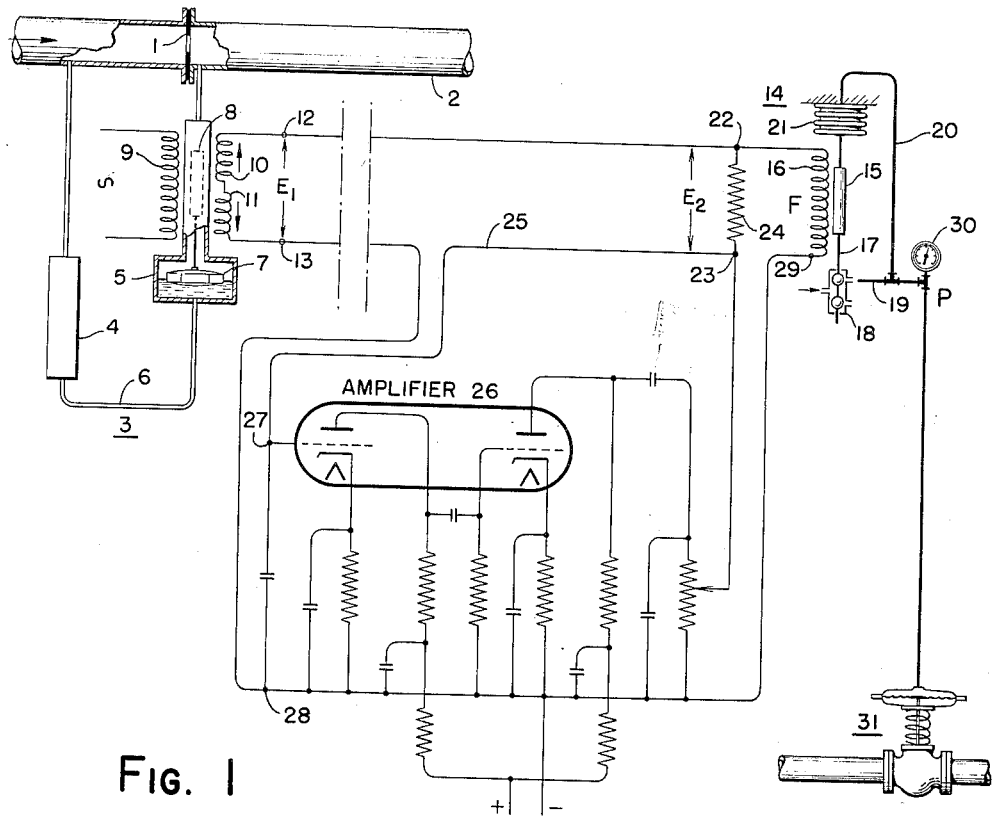
Fig. 1 is a diagrammatic representation of a fluid flow measuring and controlling system embodying our invention.

Referring now to Fig. 1, we show therein in somewhat schematic fashion an illustrative embodiment of our invention as measuring the rate of flow of a fluid, remotely indicating the measurement, and controlling a fluid flow which may be the same fluid flow being measured or may be a different one.

In the measurement or determination of a variable it is frequently desirable to give a result in terms of a function of the variable, or conversely it is frequently desirable to use a function of the variable in ascertaining the value of the variable. For example, in measuring or determining the volume rate of flow or weight rate of flow of a fluid through a conduit, it is more expeditious to employ the pressure differential produced by the fluid passing through a restriction in a conduit as an indication inferentially of the actual volume rate or weight rate of the fluid flow. A quadratic relation exists between such differential pressure and the actual rate of flow. The result, as for instance the visual indication or continuous record, is desirably to be in units of volume rate or weight rate per unit of time and frequently an integration with respect to time is desired. Through the agency of our invention it is readily possible to have means sensitive to such a differential pressure and produce, at a local or remote location, a continuous visual indication in terms of weight rate or volume rate. In other words, to continuously extract the square root.

Our calculating system is adapted to the production of a function of a variable or to the use of a function of the variable in producing a measurement of a variable. For example, a functional relation between the variable and some indication of the variable may be a square root relation or a linear relation or a square relation or the like.

It is common in the metering art to insert a restriction, such as an orifice plate $I$, in the path $2$ of the fluid flow and thus obtain a "head" or differential pressure bearing a functional relation to rate of fluid flow through the restriction. Irrespective of whether the measurement is to be in volume rate or in weight rate, it is known that the rate varies as $\sqrt{h}$, i. e. as the square root of the differential pressure measured across the orifice or other restriction $1$.

Numerous complicated metering arrangements have been proposed and used for extracting the square root relationship between head and rate. The simplest possible form of U-tube manometer with a float on the mercury in one leg will provide a measurement of the differential pressure. The complication occurs in the mechanism necessary to translate such float motion into terms of rate of flow.

In a large percentage of applications it is desired to provide on or more remote indications (or recordings) of the flow measurement and furthermost the flow measurement may be utilized to control. Various telemetric schemes have been proposed and used, both hydraulic, pneumatic or electrical.

Our invention, as illustrated and to be described, provides a simple and accurate solution of the combination of the two problems above stated, namely, a remote visual indication of the measurement of the fluid flow in terms of rate. We electrically and telemetrically measure the fluid flow and turn the measurement into a fluid loading pressure which may be at a remote location.

Referring now specifically to Fig. 1, we show a flow meter 3 comprising a U-tube having legs 4 and 5 joined by a tube 6. A sealing liquid, such as mercury, partially fills the U-tube. On the surface of the mercury in leg 5 is a float 7 adapted to position a magnetic member such as a core 8 within a portion of the leg 5 of non-magnetic material. The meter 3, which we will term the transmitter, includes a movable core transformer having a primary alternating current energized winding 9 and a pair of bucking secondary windings 10, 11. The bucking secondary windings 10, 11 are inductively energized from the primary winding 9 through the agency of the core 8. When the core is in a central or neutral position relative to the windings 9, 10 and 11 a voltage $E_1=0$ exists across the terminals 12, 13. We indicate at the terminal 12, 13 that a distance may exist spacing the transmitter assembly 3 from the receiver mechanism. While it is thus possible to have the transmitter and receiver spaced a considerable distance this is not necessary and they may be located adjacent if desired.

When the core 8 is moved from neutral position toward one end of the coil assembly a voltage $E_1$ is developed as a function of core position. The relation is linear over the operating range. In the present arrangement the movement of the core 8, from a central or neutral voltage position, is expected to be all in one direction from zero fluid flow to maximum rate of fluid flow or from a value $h=0$ to a value of $h=100\%$ fluid flow rate. The proportionality and arrangement of the manometer legs 4, 5 is such that the float 7 will locate the core 8 at the desired electrical neutral of the assembly when zero mercury differential or $h=0$ between the U-tube legs 4, 5 exists. It is convenient, therefore, to express the transmitter output as follows:

$$E_1=h$$

when $E_1$ represents voltage output at terminals 12, 13

$h$ represents the variable being measured, in this case differential head of the flowing fluid across the orifice restriction 1

At 14 we indicate a receiver transducer including a solenoid plunger 15 and a power winding 16 for positioning the same. The plunger 15 is adapted to position the stem 17 of a pilot valve 18 such as is disclosed in Johnson 2,054,464 for establishing in this instance an air loading pressure in the pipe 19. A branch 20 of the pipe 19 leads the air loading pressure to within a bellows 21 whose movable end is connected to oppose the positioning of the plunger 15 acted thereon by the force of the solenoid winding 16. The arrangement is such that a change in value of the force (F) of the winding 16 acting upon the plunger 15 positions the same to thereby position the pilot stem 17 and vary the air pressure within the pipes 19 and 20, and thus within the bellows 21, whereby the system comes to balance when the air pressure (P) in the pipe 19 balances the force (F) in the winding 16 and thus said air pressure becomes a measure of said force.

At 24 we show a fixed resistor between terminals 22, 23. The terminal 22 is connected to the terminal 12 and to one end of the winding 16. The terminal 23 is connected by a conductor 25 to the terminal 13 previously mentioned. We thus provide a balanceable loop network including the windings 10, 11, resistance 24 and conductor 25. We designate the voltage drop across the resistance 24 as $E_2$ and the loop is in balance when $E_1=E_2$. Located in the conductor 25 is an amplifier section 26 which may be as disclosed in the Ryder Patents 2,275,317 and 2,333,393. The loop is energized inductively from the primary 9 through the agency of the positionable core 8. When the core 8 is in its neutral position voltage $E_1=0$, $E_2=0$, and the loop is in balance with no unbalance voltage appearing at the amplifier input terminals 27, 28. If a differential pressure $(h)$ across the orifice 1 appears so that $h$ is greater than 0, then $E_1>0$ and $E_1>E_2$ with an unbalance signal appearing across terminals 27, 28. As a result of this unbalance signal the amplifier 26 produces an output voltage across terminals 23, 29 of sufficient magnitude to vary $E_2$ until $E_2=E_1$ and the network is returned to balance. This output voltage causes a current flow through the winding 16 which varies the value F effective upon the position of plunger 15 and thereby upon the pilot 18 until the air loading pressure in the pipe 20 and bellows 21 is sufficient to counter balance F, or until $P=F$. It will thus be seen that when the entire system is again in balance P is a measure of F which bears a functional relation to the position of core 8.

At balance
$$E_2=E_1=h$$

but
$$E_2=IR$$

where
$$R=\text{resistance of 24}$$

and
$$F=K_1I^2=K_2h^2$$

where $F$=force of solenoid 16 upon plunger 15
$K_1$ and $K_2$=are constants
$I$=current through 16 then
$$P \propto F \propto h^2$$

It will thus be seen that the circuit of Fig. 1 produces at an indicator 30, and at a control valve 31, an air loading pressure P which varies directly with the force F and directly with $h^2$ thus providing an indication in square relation to the differential pressure across the orifice 1. It will be appreciated that in the measurement of fluid rate of flow the system so far described does not have immediate utility because the relation between head and flow rate is a square root relation rather than a square relation and P is proportional to the fourth power of flow rate. It would be desired to have the indicator 30 indicate either directly in terms of differential pressure ($h$) or in terms of $\sqrt{h}$, namely in terms of rate of fluid flow either on a volume basis or a weight rate basis. However, the example given clearly indicates the construction and operation of the system which interrelates functional relationship between a variable such as the differential head and a resulting fluid loading pressure. We will now describe a modification of our invention wherein the fluid loading pressure P is in linear relationship to the variable being measured such that $P=h$.

Figure 2:
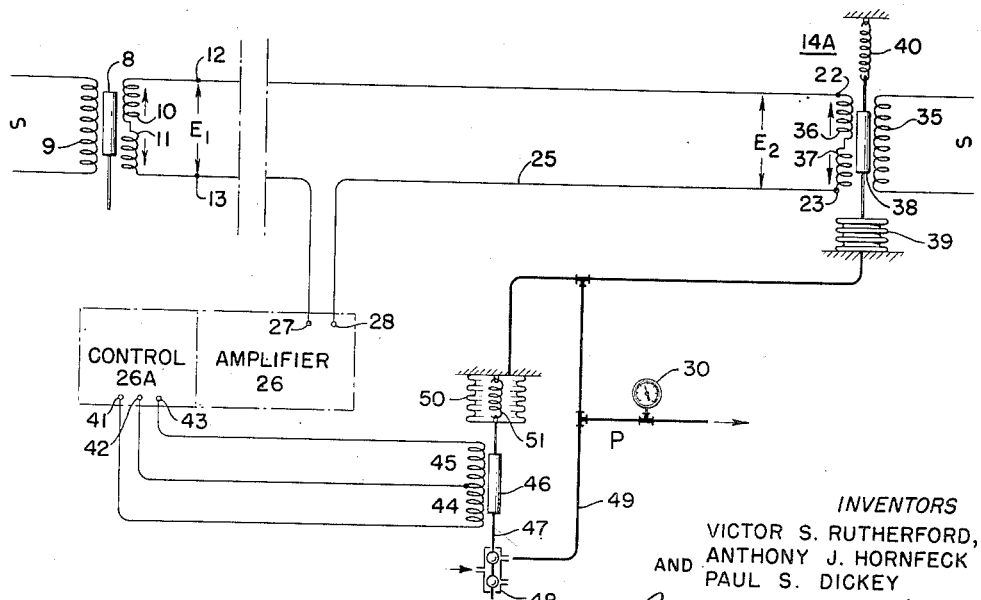
Fig. 2 illustrates a further embodiment of our invention.
Figure 3:
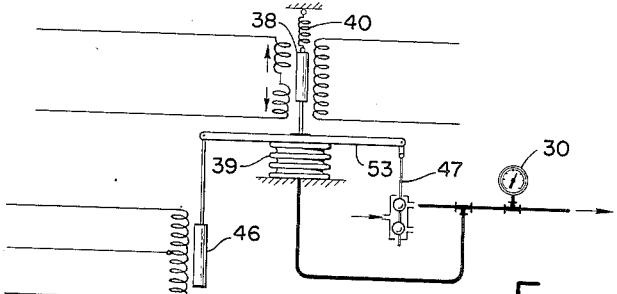
Fig. 3 is a modification of a portion of Fig. 2.

Referring now particularly to Figs. 2 and 3, we have indicated by the same numerals those parts which are identical with parts previously numbered in Fig. 1.

At receiver 14A we show an alternating current energized primary winding 35 (similar to the primary winding 9) and connected across an alternating current source of power. We also provide at the receiver a pair of bucking secondary windings 36, 37 similar to the transmitter windings 10, 11. Coupling the windings 35, 36, 37 is a core piece 38 positionable by a bellows 39 and a loading spring 40. It will be apparent that the position of the core 38, relative to the windings 35, 36 and 37 will be the result of a balance in forces between the fluid pressure loaded bellows 39 and the spring 40. Across the terminals 22, 23 of the receiver secondaries there will exist a voltage $E_2$. The core 38 starts from a position central or neutral relative to the windings 35, 36 and 37 and moves its total travel in one direction therefrom. At maximum travel of the core 38, corresponding to maximum travel of the core 8 and therefore the maximum rate of fluid flow, voltage $E_1=E_2$. At any time when the relative positions of the cores 8, 38 is not electrically the same then $E_1$ does not equal $E_2$ and an unbalance voltage appears across the terminals 27, 28.

The windings 10, 11, 36, 37 provide a balanceable loop circuit in one conductor of which is positioned the amplifier 26 sensitive to unbalance of the loop. At any time that $E_1$ is not equal to $E_2$ the unbalance voltage across the terminals 27, 28 is effective, through the amplifier 26 and a control section 26A, to provide a D.-C. voltage at the output terminals 41, 42, 43 of magnitude determined by the extent of unbalance and of a sense determined by the phase of the unbalance.

Any direct current available across terminals 41, 42 serves to energize the solenoid winding 44 while any direct current available across terminals 42, 43 serves to energize the winding 45.

Cooperating with the windings 44, 45 is a plunger 46 acted upon by the solenoid effects of windings 44, 45 and positioned thereby in accordance with the algebraic summation of the direct current energizing of said windings 44, 45. When the measuring network is in balance and no voltage shows at terminals 27, 28, then the windings 44, 45 are equally energized. Unbalance in the measuring circuit results in a positioning of the core 46 and thereby a positioning of the pilot stem 47 of the pilot valve 48 establishing in the pipe 49 a fluid loading pressure of value P which is effective within the bellows 39 and within a second bellows 50 the latter of which is loaded by a spring 51.

It will thus be seen that in operation, assuming a balanced electrical condition of the measuring network, a change in position of the core 8, due to change in rate of fluid flow and thereby in the differential pressure $h$, will unbalance the network. The direction of such unbalance and the magnitude thereof will be evident by a plus phase or a minus phase across the terminals 27, 28 and by the magnitude of the voltage across these terminals. The phase sensitive amplifier 26 will actuate the control circuit 26A to unbalance the windings 44, 45 and position the core 46 and thereby the pilot 47. Such movement will vary the air pressure P which is effective within the bellows 39 and 50 to the end that the bellows 39 will position the plunger core 38 in a direction to vary the voltage $E_2$ until it is again equal to the voltage $E_1$ reducing the signal across terminals 27, 28 to zero. At the same time the air loading pressure P is effective within the bellows 50 against the loading spring 51 to oppose positioning of the core 46 by the winding 44, 45 and the entire system comes to balance when $E_1=E_2$ and $P=h$. Thus, the value of P is in linear relation to the head $h$ existing across the orifice 1. In this embodiment the indicator 30 would show directly the value of the differential pressure existing across the orifice 1 and the circuit arrangement is therefore exemplary of the linear measurment at the remote point of any variable whose value is to be manifested in linearity therewith. While we have chosen to describe the positioning of core 8 in a manner similar to that described for Fig. 1, it will be understood that the core 8 may in this embodiment be positioned by a single static pressure or the position of an object or any other variable whose manifestation is desirably to be in linearity with the actual of the variable.

In Fig. 3 we show a slight mechanical rearrangement of certain of the parts of Fig. 2 wherein only a single bellows 39 is used and simultaneously positions the core 38 and the pilot stem 47. In other words, a beam 53 is acted upon by the bellows 39, the solenoid plunger 46 and the spring 40 to position the core 38 and the pilot stem 47. Here again, as in Fig. 2, the value $P=h$.

Figure 4:
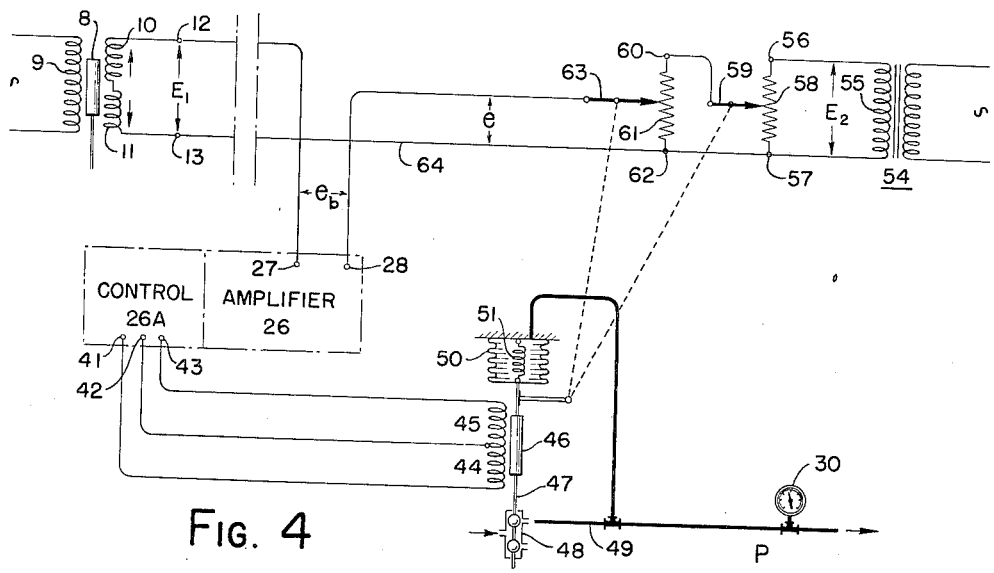
Fig. 4 illustrates another embodiment of the invention.
Figure 5:
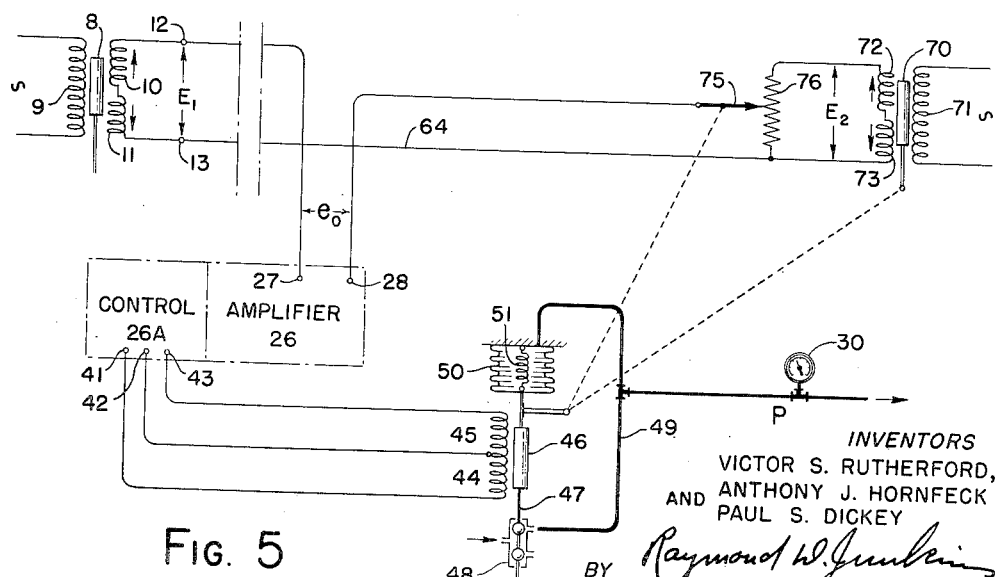
Fig. 5 shows a somewhat different arrangement of Fig. 4.

In Figs. 4 and 5 we show arrangements of our invention capable of extracting the square root so that in effect $P=\sqrt{h}$ and the indicator 30 would give a direct reading of fluid rate of flow on either a volume or a weight rate basis.

The balanceable electric network of Fig. 4 includes secondary windings 10, 11 as well as the secondary 55 of a transformer 54. The voltage across the secondary 55 may be repersented by $E_2$.

Across the output terminals 56, 57 of the secondary 55 we connect a resistance 58 which may be variably contacted by a movable contact arm 59 joined at 60 to one end of a resistance 61 whose other end has a terminal 62. The resistance 61 may be variably contacted by a contact arm 63 leading from the terminal 28. The conductor 64 joins the terminals 13, 62, 57 and one end of the secondary 55.

The contact arms 59, 63 are arranged to be simultaneously moved by the solenoid plunger 46 along with the pilot stem 47. As previously explained the positioning of the solenoid plunger 46 is determined as to direction and extent by relative energization of windings 44, 45 as a result of appearance of a unbalance of voltage across the terminals 27, 28.

If the system is in balance and a change occurs in the fluid rate of flow, then the resultant movement of core 8 varies the value of $E_1$ and an unbalance of voltage of predetermined phase and magnitude appears across the terminals 27, 28. This results, through the amplifier 26 and control circuit 26A, in an unbalancing of energization of windings 44, 45 and a positioning thereby of the solenoid plunger 46. Such positioning moves the pilot stem 47 to vary the value of fluid loading pressure P in the pipe 49 and in the balancing bellows 50 until the effect of bellows 50, spring 51 and solenoid windings 44, 45 is in balance. Movement of the core 46 simultaneously positions the contacts 59, 63 to vary the proportion of the resistances 58, 61 respectively which are in the loop network. The motion of core 46 is linear with respect to the positioning of contacts 59, 63 but is not linear with respect to movement of the core 8 or inferentially to the change in differential pressure. Thus a change in differential pressure across the orifice 1 (resulting from a change in rate of flow) extracts the functional relation between the two and produces an indication or value P in linear relation to rate of flow.

The balancing of the network and the extraction of the square root function may be explained as follows:

At balance
$$e_b = 0$$
and hence
$$E_1 = e$$
Let
$$\theta = \frac{\text{Motion of 59, 63 over 58, 61}}{\text{Total possible motion}} = \frac{\text{Actual flow}}{\text{Max. flow}}$$
$$X = \frac{\text{Motion of core 8}}{\text{Total possible motion}} = \frac{\text{Actual head}}{\text{Max. head}}$$
$E_1 = E_0 X$ and $E_2 = E_0$
$E_0 =$ Max. voltage available when $X = 1$
$E_2\theta =$ Voltage between 60 and 57
$e = ($Voltage between 60 and 57$) \cdot \theta$ Then
$$e = E_2\theta \cdot \theta = E_2\theta^2$$
Hence
$$E_0 X = E_0 \theta^2$$
and
$$\theta^2 = X$$
$$\theta = \sqrt{X}$$

Fig. 5, in somewhat similar fashion provides an air loading pressure wherein $P = \sqrt{h}$. In this embodiment the receiver includes a core 70 positionable relative to a primary 71 and a pair of bucking secondaries 72, 73 to provide a voltage $E_2$ across a resistance 76 having a movable slider 75. The solenoid core 46 is adapted to position the core 70 and the contactor 75 together and the result is the same as in Fig. 4 wherein the pressure P indicated at 30 is representative of $\sqrt{h}$ which positions the core 8. Thus, the arrangements of Figs. 4 and 5 will provide an indication directly of fluid flow rate from a measurement of differential pressure across the orifice 1.

It will be seen that we have shown three general arrangements whereby, in one instance, the indication of the variable is in accordance with the square of the variable, in the second instance the indication is in linear relation, and in the third instance the indication is the square root of the value of the variable. These are by way of example to clearly illustrate that desired functional relation may be obtained between the value of the variable and the fluid loading pressure P which is established for indication, recording and/or control purposes.

It will be appreciated that while we have chosen to illustrate and describe certain preferred embodiments of our invention, we do this by way of example only and not in a limiting manner.

What we claim as new, and desire to secure by Letters Patent of the United States, is:

1. Apparatus for establishing a relationship between the value of a variable and a fluid loading pressure for indicating, recording or control purposes, including in combination, transmitter means establishing a first electrical potential representative in magnitude of the instantaneous value of the variable, a source of fluid pressure, means responsive to a loading pressure of said fluid, a pilot valve between the source of fluid pressure and the responsive means for regulating the loading pressure, solenoid means connected to actuate the pilot valve, means establishing a second potential, a network comparing the potentials, amplifier means responsive to the difference between the first and second potentials for establishing a third potential for actuating the solenoid means and energizing the means to establish the second potential, second pressure responsive means actuated by the loading pressure, and means connecting said last mentioned means to mechanically exert its force on the pilot valve.

2. The apparatus of claim 1 in which the means establishing the second potential includes a resistance in the comparing network across which the second potential is impressed by the output of the amplifier means.

3. The apparatus of claim 1 in which the solenoid means is connected to the pilot valve by operative linkage and the amplifier means energizes the means establishing the second potential through a mechanical connection with the operative linkage.

4. The apparatus of claim 1 in which the means establishing the second potential includes a plurality of potential adjusting means in cascade, and the amplifier energizes the means establishing the second potential through mechanical connections between the solenoid core and the plurality of potential adjusting means.

5. Apparatus for establishing a functional relation between the value of a variable and a fluid loading pressure, including in combination, means establishing an electrical potential representative in magnitude of the instantaneous value of a function of the variable, means establishing a second potential, means to adjust the value of the second potential, a circuit connecting the potentials in opposition, means which include a solenoid core actuated by the potential difference, a source of fluid pressure, a pilot valve mechanically connected to the solenoid core, a first bellows responsive to the fluid pressure produced by the pilot valve mechanically connected to the solenoid core, a second bellows responsive to the fluid pressure produced by the pilot valve, and means mechanically connecting the second pressure responsive bellows to the means for adjusting the value of the second potential.

6. Apparatus for establishing the relationship between the value of a variable and a fluid loading pressure, including in combination, means for establishing an A.-C. potential representative in magnitude of the instantaneous value of a variable, adjustable means for establishing a second A.-C. potential, a circuit connecting said potentials in opposition, an amplifier having its input energized by the difference between said potentials and having an output, a means including a solenoid core responsive to said output, a source of constant fluid pressure, a pressure responsive bellows connected to said solenoid core, a pilot valve between said source of fluid pressure and said bellows, said pilot valve controlling the loading pressure to the said bellows and actuated conjointly by said pressure responsive bellows and said solenoid core, and means responsive to the loading pressure for adjusting the value of said second potential to balance said circuit.

7. A system for measuring and/or controlling the value of a variable including, a balanceable loop network, a first movable core transformer included in said loop network sensitive to the value of the variable, a second movable core transformer whose output balances the network, means sensitive to the loop network unbalance, a solenoid core means actuated by said means sensitive to the loop network balance, a pilot valve means for establishing a fluid pressure in accordance with said core actuation, bellows means responsive to the fluid pressure from said pilot valve for opposing the solenoid core movement, and a second bellows means connected to said second core movable transformer, whereby said second movable core in balancing the network is moved in accordance with the fluid loading pressure from said pilot valve active in the second bellows.

8. Apparatus for establishing the relationship between the value of a variable and a fluid loading pressure, including in combination, means for establishing an A.-C. potential representative in magnitude of the instantaneous value of a variable, adjustable means for establishing a second A.-C. potential, a circuit connecting said potentials in opposition, an amplifier having its input energized by the difference in said potentials and producing an output, means responsive to said output to act on a solenoid core directionally and in intensity in accordance with said difference, a source of constant fluid pressure, a pressure responsive bellows means connected to said solenoid core, a pilot valve between said fluid pressure source and said bellows means and actuated by the bellows and solenoid core to control the loading pressure actuating said bellows means and established as the loading pressure varying directly with the value of the variable, and means responsive to the position of said pilot valve for adjusting the means establishing the second potential to balance said circuit as the loading pressure is established.

VICTOR S. RUTHERFORD.
ANTHONY J. HORNFECK.
PAUL S. DICKEY.

References Cited in the file of this patent

UNITED STATES PATENTS

| Number | Name | Date |
|---|---|---|
| 1,580,679 | Roucka | Apr. 13, 1926 |
| 1,758,450 | Machlet | May 13, 1930 |
| 1,877,810 | Chamberlain | Sept. 20, 1932 |
| 2,278,396 | Sauer | Mar. 31, 1942 |
| 2,317,807 | Ryder | Apr. 27, 1943 |
| 2,420,539 | Hornfeck | May 13, 1947 |
| 2,523,198 | Davies | Sept. 19, 1950 |